US012681804B2

(12) United States Patent
Yang

(10) Patent No.: US 12,681,804 B2
(45) Date of Patent: Jul. 14, 2026

(54) METHOD FOR ACCESSING FLASH MEMORY MODULE AND ASSOCIATED FLASH MEMORY CONTROLLER AND MEMORY DEVICE

(71) Applicant: Silicon Motion, Inc., Hsinchu County (TW)

(72) Inventor: Tsung-Chieh Yang, Hsinchu City (TW)

(73) Assignee: Silicon Motion, Inc., Hsinchu County (TW)

( * ) Notice: Subject to any disclaimer, the term of this patent is extended or adjusted under 35 U.S.C. 154(b) by 71 days.

(21) Appl. No.: 18/810,497

(22) Filed: Aug. 20, 2024

(65) Prior Publication Data

US 2025/0077350 A1      Mar. 6, 2025

Related U.S. Application Data

(60) Provisional application No. 63/536,055, filed on Aug. 31, 2023.

(30) Foreign Application Priority Data

Aug. 2, 2024      (TW) ................................. 113128973

(51) Int. Cl.
*G06F 11/10*              (2006.01)
(52) U.S. Cl.
CPC ...... *G06F 11/1068* (2013.01); *G06F 11/1016* (2013.01)
(58) Field of Classification Search
None
See application file for complete search history.

(56) References Cited

U.S. PATENT DOCUMENTS

| | | | |
|---|---|---|---|
| 8,572,465 B2 | 10/2013 | Uchikawa | |
| 8,739,000 B2 | 5/2014 | Ryan | |
| 9,898,363 B2 | 2/2018 | Kim | |
| 10,176,041 B2 * | 1/2019 | Wu ..................... | G06F 11/1068 |
| 2006/0274577 A1 | 12/2006 | Pascucci | |
| 2012/0144267 A1 | 6/2012 | Yeh | |

(Continued)

FOREIGN PATENT DOCUMENTS

| | | |
|---|---|---|
| CN | 103544073 | 1/2014 |
| CN | 107452421 | 12/2017 |

(Continued)

*Primary Examiner* — Guerrier Merant
(74) *Attorney, Agent, or Firm* — Winston Hsu

(57)            ABSTRACT

The present invention provides a method for accessing a flash memory module, wherein the method includes the steps of: using a first set of threshold voltages, a positively adjusted first set of threshold voltages and a negatively adjusted first set of threshold voltages to read a first logical page of a physical page of the flash memory module to obtain first readout information, second readout information and third readout information, respectively; decoding the first readout information, the second readout information and the third readout information to generate decoded data of the first logical page; and generating a LLR mapping table according to the decode data of the first logical page, the first readout information, the second readout information and the third readout information, for use when reading and decoding other logical pages.

12 Claims, 6 Drawing Sheets

(56)  References Cited

U.S. PATENT DOCUMENTS

| | | |
|---|---|---|
| 2013/0215678 A1 | 8/2013 | Yang |
| 2014/0026018 A1 | 1/2014 | Yang |
| 2014/0029336 A1 | 1/2014 | Venkitachalam |
| 2017/0168894 A1 | 6/2017 | Kim |
| 2017/0294217 A1 | 10/2017 | Lin |
| 2018/0012663 A1 | 1/2018 | Alhussien |
| 2019/0081641 A1* | 3/2019 | Symons ............. H03M 13/1111 |
| 2019/0384671 A1 | 12/2019 | Chen |
| 2020/0057572 A1 | 2/2020 | Lin |
| 2020/0057693 A1 | 2/2020 | Kim |
| 2020/0066354 A1 | 2/2020 | Ioannou |
| 2020/0319964 A1 | 10/2020 | Kim |
| 2020/0373944 A1 | 11/2020 | Cho |
| 2021/0306003 A1 | 9/2021 | Kim |
| 2023/0035079 A1 | 2/2023 | Han |
| 2025/0377794 A1* | 12/2025 | Shikata ................. G06F 3/0659 |

FOREIGN PATENT DOCUMENTS

| | | |
|---|---|---|
| TW | I466123 B | 12/2014 |
| TW | I612527 | 1/2018 |
| TW | I804359 | 6/2023 |

\* cited by examiner

METHOD FOR ACCESSING FLASH MEMORY MODULE AND ASSOCIATED FLASH MEMORY CONTROLLER AND MEMORY DEVICE

CROSS REFERENCE TO RELATED APPLICATIONS

This application claims the benefit of U.S. Provisional Application No. 63/536,055, filed on Aug. 31, 2023. The content of the application is incorporated herein by reference.

BACKGROUND OF THE INVENTION

1. Field of the Invention

The present invention relates to a flash memory controller.

2. Description of the Prior Art

Flash memory can be electrically erased and programmed for data storage. It is widely used in memory cards, solid-state drives, portable multimedia players, etc. As the flash memory is a non-volatile memory, no power is needed to maintain the information stored in the flash memory. Besides, the flash memory offers fast read access and better shock resistance. These characteristics explain the popularity of the flash memory.

The flash memories may be categorized into NOR-type flash memories and NAND-type flash memories. Regarding the NAND flash memory, it has reduced erasing and programming time and requires less chip area per cell, thus allowing greater storage density and lower cost per bit than the NOR flash memory. In general, the flash memory stores data in an array of memory cells made from floating-gate transistors. Each memory cell can store one bit of information or more than one bit of information by adequately controlling the number of electrical charge on its floating gate to configure the threshold voltage required for turning on the memory cell made of a floating-gate transistor. In this way, when one or more predetermined control gate voltages are applied to a control gate of the floating-gate transistor, the conductive status of the floating-gate transistor would indicate the binary digit(s) stored by the floating-gate transistor.

However, due to certain factors, the number of electrical charge originally stored on one flash memory cell may be affected/disturbed. For example, the interference presented in the flash memory may be originated from write (program) disturbance, read disturbance, and/or retention disturbance. Taking a NAND flash memory including memory cells each storing more than one bit of information for example, one physical page includes multiple logical pages, and each of the logical pages is read by using one or more control gate voltages. For instance, regarding one flash memory cell which is configured to store four bits of information, the flash memory cell may have one of sixteen possible states (i.e., electrical charge levels) corresponding to different electrical charge amounts (i.e., different threshold voltages), respectively. However, due to the increase of the program/erase (P/E) count and/or the retention time, the threshold voltage distribution of memory cells in the flash memory may be changed. Thus, using original control gate voltage setting (i.e., threshold voltage setting) to read the stored bits from the memory cell may fail to obtain the correct stored information due to the changed threshold voltage distribution.

SUMMARY OF THE INVENTION

Therefore, one of the objects of the present invention is to provide a flash memory controller and a related control method, which can efficiently establish/update a log likelihood ratio (LLR) mapping table based on the readout information of the flash memory for subsequent decoding operation, to solve the problems described in the prior art.

According to one embodiment of the present invention, a method for accessing a flash memory module comprises the steps of: using a first set of threshold voltages, a positively adjusted first set of threshold voltages and a negatively adjusted first set of threshold voltages to read a first logical page of a physical page of the flash memory module to obtain first readout information, second readout information and third readout information, respectively; decoding the first readout information, the second readout information and the third readout information to generate decoded data of the first logical page; and generating a LLR mapping table according to the decode data of the first logical page, the first readout information, the second readout information and the third readout information, for use when reading and decoding other logical pages.

According to one embodiment of the present invention, a flash memory controller configured to access a flash memory module is disclosed. The flash memory controller comprises a read-only memory, configured to store a program code, a buffer memory and a microprocessor, configured to execute the program code to control access of the flash memory module. The microprocessor is configured to perform the steps of: using a first set of threshold voltages, a positively adjusted first set of threshold voltages and a negatively adjusted first set of threshold voltages to read a first logical page of a physical page of the flash memory module to obtain first readout information, second readout information and third readout information, respectively; decoding the first readout information, the second readout information and the third readout information to generate decoded data of the first logical page; and generating a LLR mapping table according to the decode data of the first logical page, the first readout information, the second readout information and the third readout information, for use when reading and decoding other logical pages.

According to one embodiment of the present invention, a memory device comprising a flash memory module and a flash memory controller configured to access the flash memory module is disclosed. The flash memory controller is configured to perform the steps of: using a first set of threshold voltages, a positively adjusted first set of threshold voltages and a negatively adjusted first set of threshold voltages to read a first logical page of a physical page of the flash memory module to obtain first readout information, second readout information and third readout information, respectively; decoding the first readout information, the second readout information and the third readout information to generate decoded data of the first logical page; and generating a LLR mapping table according to the decode data of the first logical page, the first readout information, the second readout information and the third readout information, for use when reading and decoding other logical pages.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
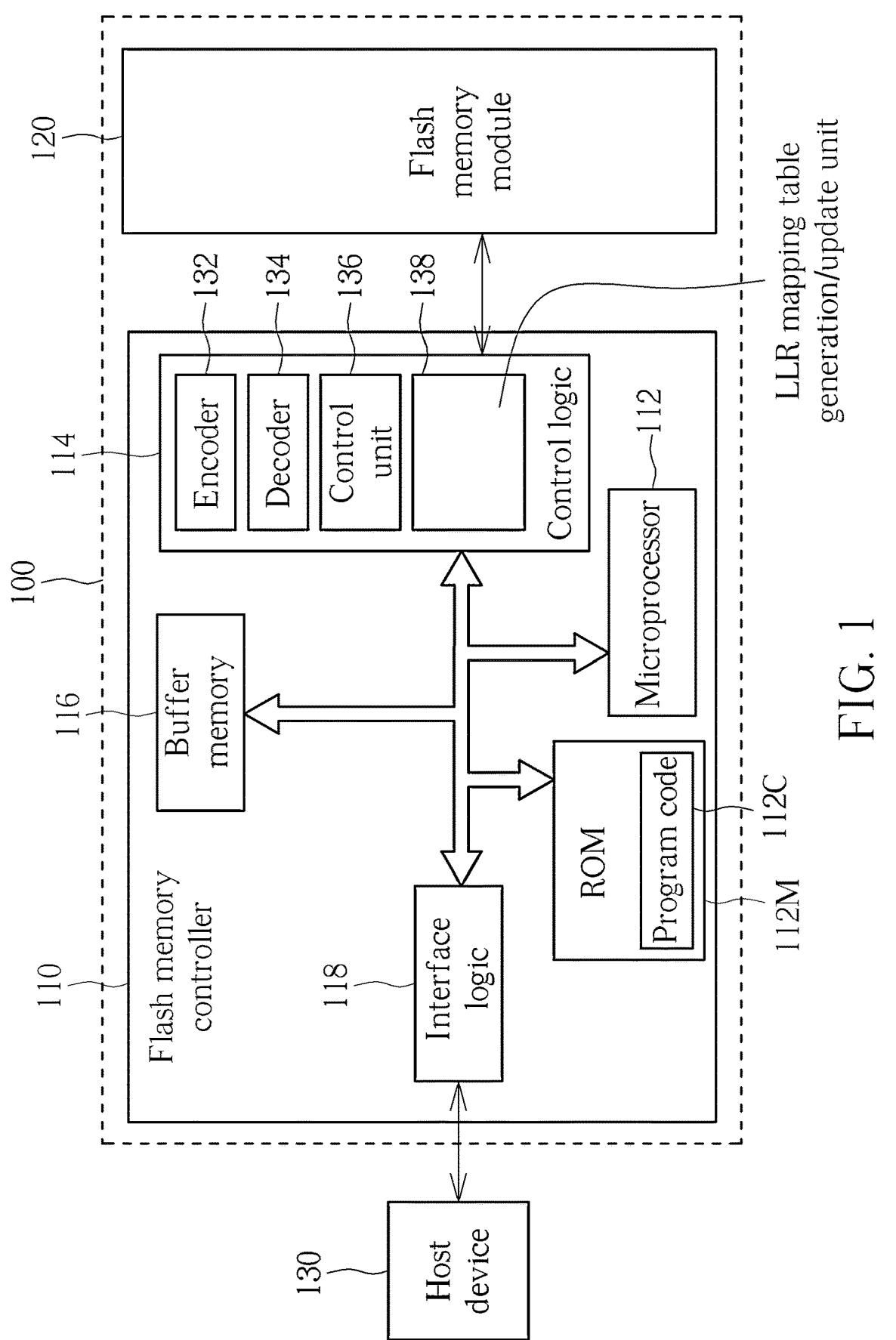
FIG. 1 is a diagram illustrating a memory device according to one embodiment of the present invention.

FIG. 1 is a diagram illustrating a memory device 100 according to one embodiment of the present invention. The memory device 100 includes a flash memory controller 110 and a flash memory module 120, and the flash memory controller 110 is arranged to access the flash memory module 120. In this embodiment, the flash memory controller 110 includes a microprocessor 112, a read only memory (ROM) 112M, a control logic 114, a buffer memory 116, and an interface logic 118. The ROM 112M is arranged to store a program code 112C. The microprocessor 112 is arranged to execute the program code 112C to control access of the flash memory module 120. The control logic 114 includes an encoder 132, a decoder 134, a control unit 136 and a LLR mapping table generation/update unit 138. The encoder 132 is arranged to encode data written into the flash memory module 120 to generate a corresponding check code (or an error correction code (ECC)). The decoder 134 is arranged to decode data read from the flash memory module 120. In addition, the control unit 136 and the LLR mapping table generation/update unit 138 are implemented by circuit components, and their specific operations will be described in subsequent embodiments.

The flash memory module 120 includes multiple flash memory chips, wherein each of the multiple flash memory chips includes a plurality of blocks, and the flash memory controller 110 may perform a copy operation, an erase operation, or a data merging operation upon the flash memory module 120 in units of blocks. In addition, a block may record a specific number of pages, wherein the flash memory controller 110 may perform a data writing operation upon the flash memory module 120 in units of pages. In other words, the smallest erase unit for the flash memory module 120 is a block, and the smallest writing unit for the flash memory module 120 is a page.

In practice, the flash memory controller 110 that executes the program code 112C through the microprocessor 112 may utilize its own internal components to perform many control operations. For example, the flash memory controller 110 may utilize the control interface 114 to control access of the flash memory module 120 (more particularly, control access of at least one block or at least one page), utilize the buffer memory 116 to perform a required buffering operation, and utilize the interface logic 118 to communicate with a host device 130.

In one embodiment, the memory device 100 may be a portable memory device such as a memory card which conforms to one of the SD/MMC, CF, MS and XD specifications, and the host device 130 is an electronic device able to be connected to the memory device 100, such as a cellphone, a laptop, a desktop computer, etc. In another embodiment, the memory device 100 may be a solid state drive (SSD) or an embedded storage device conforming to the universal flash storage (UFS) or embedded multi-media card (EMMC) specifications, and may be arranged in an electronic device. For example, the memory device 100 may be arranged in a cellphone, a watch, a portable medical testing device (e.g., a medical bracelet), a laptop, or a desktop computer. In this case, the host device 130 may be a processor of the electronic device.

In this embodiment, the flash memory module 120 is a 3D NAND-type flash memory module, wherein each block is composed of multiple word lines, multiple bit lines, and multiple memory cells. Since architecture of the 3D NAND-type flash memory module is well known to those skilled in the art, further descriptions are omitted here.

Figure 2:
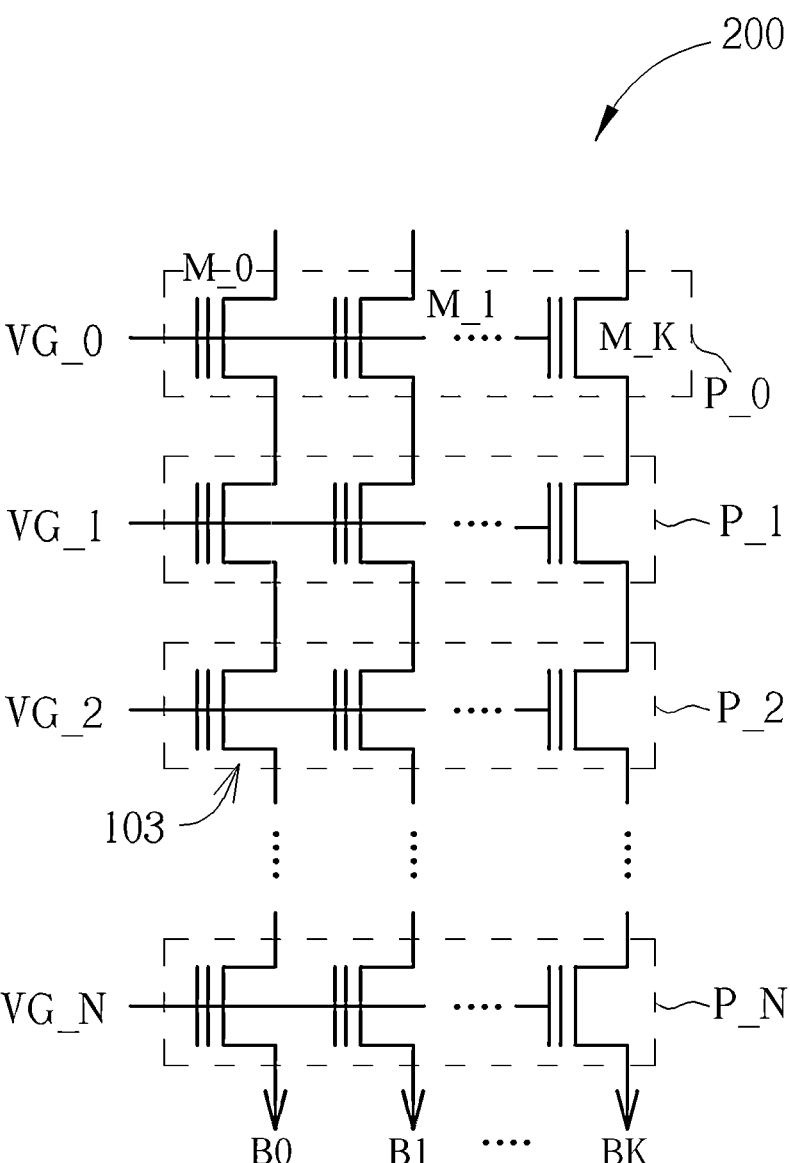
FIG. 2 is a diagram illustrating a block included in the flash memory module according to one embodiment of the present invention.

FIG. 2 is a diagram illustrating a block 200 included in the flash memory module 120 according to one embodiment of the present invention. The block 200 includes a plurality of physical pages P_0, P_1, P_2, ..., P_N, wherein each of the physical pages P_0-P_N includes a plurality of memory cells (e.g., floating-gate transistors) 103. For example, as to a target physical page P_0 to be read, it has memory cells M_0-M_K included therein. To read the data stored in the memory cells M_0-M_K of the target physical page P_0, the control gate voltages VG_0-VG_N should be properly set to read a plurality of bits B0-BK. In a case where each of the memory cell 103 is configured to store N bits, that is the target physical page P_0 comprises N logical pages, the flash memory 102 sets the control gate voltage VG_0 to $(2^N-1)$ voltage levels for identifying all of the N bits of each memory cell 103 of the target physical page P_0.

Figure 3:
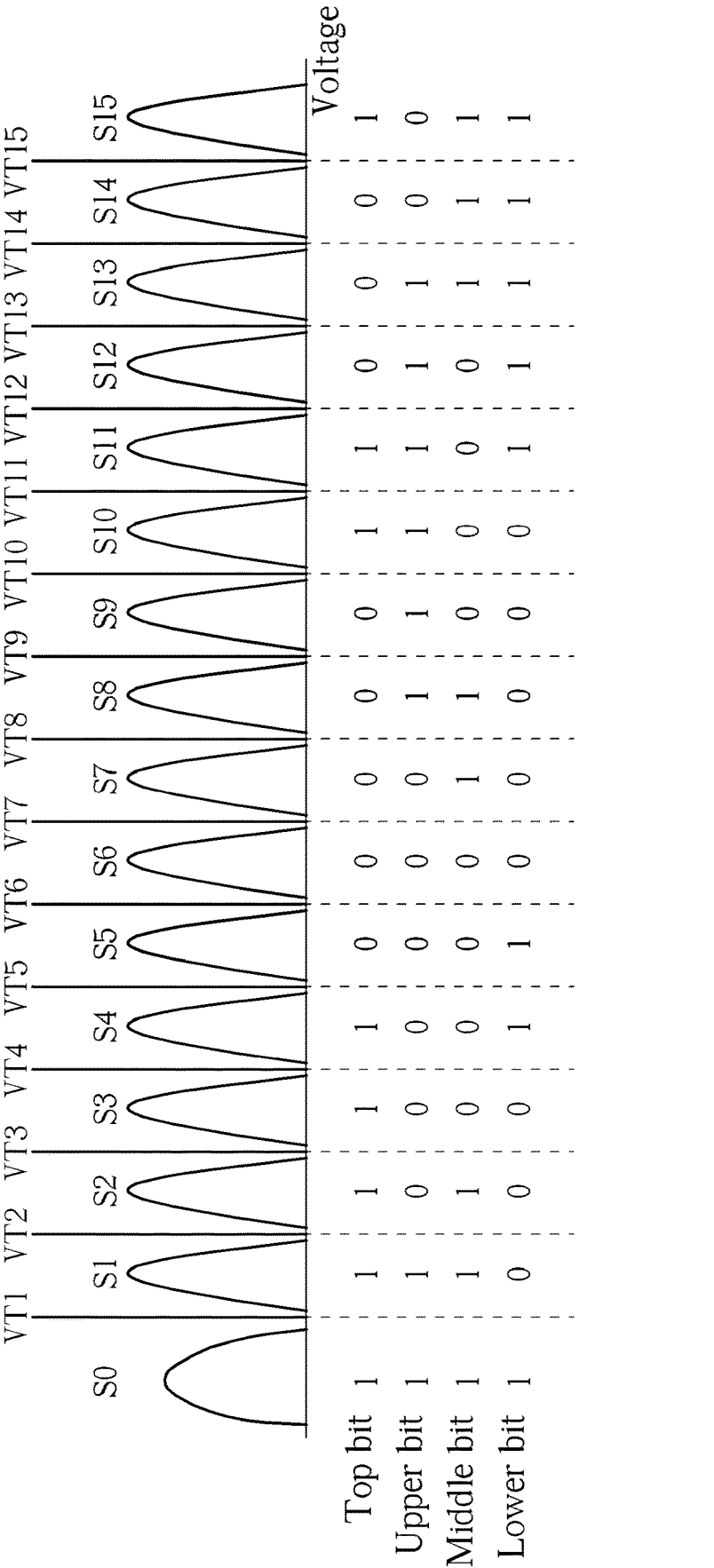
FIG. 3 is a diagram illustrating a memory unit storing four bits according to one embodiment of the present invention.

FIG. 3 is a diagram illustrating a memory unit storing four bits according to one embodiment of the present invention. As shown in FIG. 3, each memory cell can have sixteen states, and each state represents different combinations of four bits that are named as a top bit, an upper bit, a middle bit and a lower bit. In the embodiment shown in FIG. 3, when the memory cell is programmed to have the state S0, the top bit, the upper bit, the middle bit and the lower bit stored in the memory cell are (1, 1, 1, 1); when the memory cell is programmed to have the state S1, the top bit, the upper bit, the middle bit and the lower bit stored in the memory cell are (1, 1, 1, 0); when the memory cell is programmed to have the state S2, the top bit, the upper bit, the middle bit and the lower bit stored in the memory cell are (1, 0, 1, 0); when the memory cell is programmed to have the state S3, the top bit, the upper bit, the middle bit and the lower bit stored in the memory cell are (1, 0, 0, 0); when the memory cell is programmed to have the state S4, the top bit, the upper bit, the middle bit and the lower bit stored in the memory cell are (1, 0, 0, 1); when the memory cell is programmed to have the state S5, the top bit, the upper bit, the middle bit and the lower bit stored in the memory cell are (0, 0, 0, 1); when the memory cell is programmed to have the state S6, the top bit, the upper bit, the middle bit and the lower bit stored in the memory cell are (0, 0, 0, 0); when the memory cell is programmed to have the state S7, the top bit, the upper bit, the middle bit and the lower bit stored in the memory cell are (0, 0, 1, 0); when the memory cell is programmed to have the state S8, the top bit, the upper bit, the middle bit and the lower bit stored in the memory cell are (0, 1, 1, 0); when the memory cell is programmed to have the state S9, the top bit, the upper bit, the middle bit and the lower bit stored in the memory cell are (0, 1, 0, 0); when the memory cell is programmed to have the state S10, the top bit, the upper bit, the middle bit and the lower bit stored in the memory cell are (1, 1, 0, 0); when the memory cell is programmed to have the state S11, the top bit, the upper bit, the middle bit and the lower bit stored in the memory cell are (1, 1, 0, 1); when the memory cell is programmed to have the state S12, the top bit, the upper bit, the middle bit and the lower bit stored in the memory cell are (0, 1, 0, 1); when the memory cell is programmed to have the state S13, the top bit, the upper bit, the middle bit and the lower bit stored in the memory cell are (0, 1, 1, 1); when the memory cell is programmed to have the state S14, the top bit, the upper bit, the middle bit and the lower bit stored in the memory cell are (0, 0, 1, 1); and when the memory cell is programmed to have the state S15, the top bit, the upper bit, the middle bit and the lower bit stored in the memory cell are (1, 0, 1, 1).

In the relevant art, taking the page P_0 as an example, when the top bit is required to be read by the flash memory controller 110, the flash memory controller 110 can control the flash memory module 120 to apply four threshold voltages VT5, VT10, VT12 and VT15 to read the memory cell. If the memory cell is conductive when the threshold voltage VT5 is applied, the top bit is determined to be "1"; if the memory cell is not conductive when the threshold voltage VT5 is applied, and the memory cell is conductive when the threshold voltage VT10 is applied, the top bit is determined to be "0"; if the memory cell is not conductive when the threshold voltage VT10 is applied, and the memory cell is conductive when the threshold voltage VT12 is applied, the top bit is determined to be "1"; if the memory cell is not conductive when the threshold voltage VT12 is applied, and the memory cell is conductive when the threshold voltage VT15 is applied, the top bit is determined to be "0"; and if the memory cell is not conductive when the threshold voltage VT15 is applied, the top bit is determined to be "1". When the upper bit is required to be read by the flash memory controller 110, the flash memory controller 110 can control the flash memory module 120 to apply three threshold voltages VT2, VT8 and VT14 to read the memory cell. If the memory cell is conductive when the threshold voltage VT2 is applied, the upper bit is determined to be "1"; if the memory cell is not conductive when the threshold voltage VT2 is applied, and the memory cell is conductive when the threshold voltage VT8 is applied, the upper bit is determined to be "0"; if the memory cell is not conductive when the threshold voltage VT8 is applied, and the memory cell is conductive when the threshold voltage VT14 is applied, the upper bit is determined to be "0"; and if the memory cell is not conductive when the threshold voltage VT14 is applied, the upper bit is determined to be "0". When the middle bit is required to be read by the flash memory controller 110, the flash memory controller 110 can control the flash memory module 120 to apply four threshold voltages VT3, VT7, VT9 and VT13 to read the memory cell. If the memory cell is conductive when the threshold voltage VT3 is applied, the middle bit is determined to be "1"; if the memory cell is not conductive when the threshold voltage VT3 is applied, and the memory cell is conductive when the threshold voltage VT7 is applied, the middle bit is determined to be "0"; if the memory cell is not conductive when the threshold voltage VT7 is applied, and the memory cell is conductive when the threshold voltage VT9 is applied, the middle bit is determined to be "1"; if the memory cell is not conductive when the threshold voltage VT9 is applied, and the memory cell is conductive when the threshold voltage VT13 is applied, the middle bit is determined to be "0"; and if the memory cell is not conductive when the threshold voltage VT13 is applied, the middle bit is determined to be "1". When the lower bit is required to be read by the flash memory controller 110, the flash memory controller 110 can control the flash memory module 120 to apply four threshold voltages VT1, VT4, VT6 and VT11 to read the memory cell. If the memory cell is conductive when the threshold voltage VT1 is applied, the lower bit is determined to be "1"; if the memory cell is not conductive when the threshold voltage VT1 is applied, and the memory cell is conductive when the threshold voltage VT4 is applied, the lower bit is determined to be "0"; if the memory cell is not conductive when the threshold voltage VT4 is applied, and the memory cell is conductive when the threshold voltage VT6 is applied, the lower bit is determined to be "1"; if the memory cell is not conductive when the threshold voltage VT6 is applied, and the memory cell is conductive when the threshold voltage VT11 is applied, the lower bit is determined to be "0"; and if the memory cell is not conductive when the threshold voltage VT11 is applied, the lower bit is determined to be "1".

It is noted that the gray code shown in FIG. 3 is for illustratively only, and it's not a limitation of the present invention. Any suitable gray code can be used in the memory device 100, and the threshold voltages for determining the top bit, the upper bit, the middle bit and the lower bit may be changed accordingly.

Figure 4:
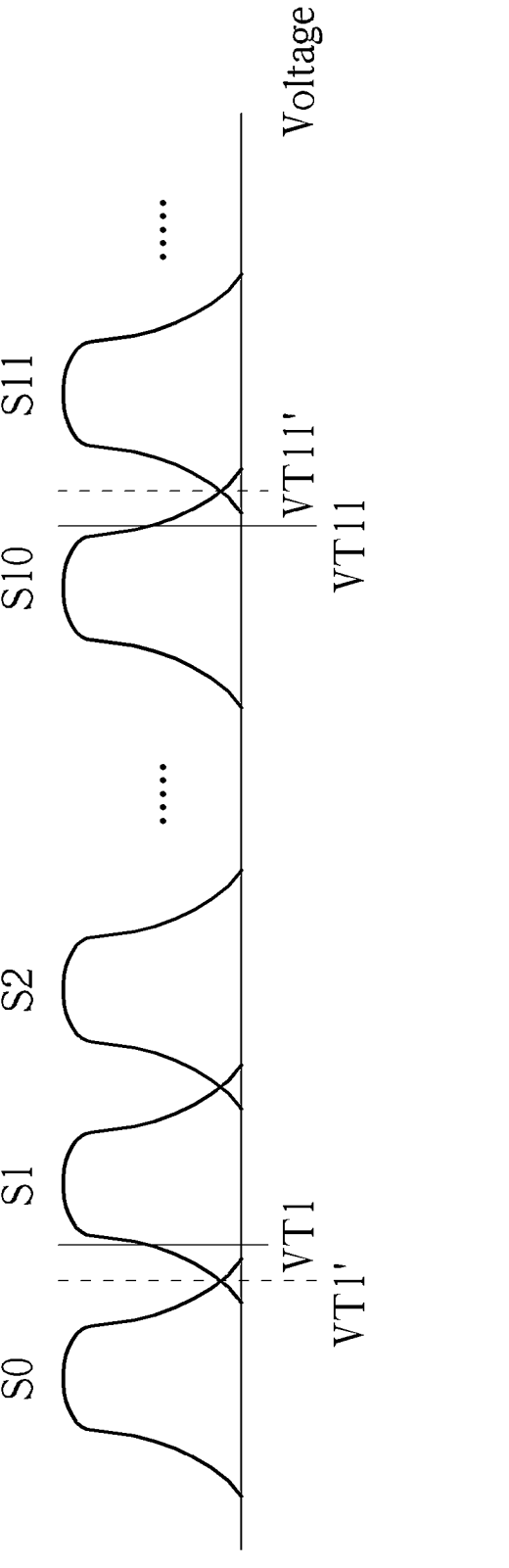
FIG. 4 is a diagram showing that the distribution of each state of the memory unit is shifted or broadened.

However, the threshold voltage distribution shown in FIG. 2 may be changed to become another threshold voltage distribution due to certain factors such as the increase of the program/erase count (P/E count) and/or the retention time. For example, the lobe-shaped distribution corresponding to each electrical charge level may be widened and/or shifted, resulting in the threshold voltage(s) used to read the memory cell is no longer the most suitable threshold voltage(s). Taking FIG. 4 as an example, due to the influence of the number of P/E count and/or data retention time of the flash memory module 120, the state S0 and the state S1 become wider and shifted to the left, and the best threshold voltage at this time should be corresponding to the intersection of the distribution of state S0 and state S1, that is, VT1' shown in FIG. 4. At this time, if the original threshold voltage VT1 is used to read the memory cell, it will make the data read from the flash memory module 120 have a higher error rate, which may cause processing problems in the decoder 134. Similarly, due to the influence of the number of P/E count and/or data retention time of the flash memory module 120, the state S10 and the state S11 become wider and shifted to the right, and the best threshold voltage at this time should be corresponding to the intersection of the distribution of state S10 and state S11, that is, VT11' shown in FIG. 4. At this time, if the original threshold voltage VT11 is used to read the memory cell, it will make the data read from the flash memory module 120 have a higher error rate, which may cause processing problems in the decoder 134. Therefore, in order to solve the above-mentioned problem of the state distribution of the memory cell being shifted and/or broadened, the present invention proposes a control method that can generate/update an LLR mapping table based on successfully decoded data to increase the probability of successful decoding of subsequently read data.

Figure 5:
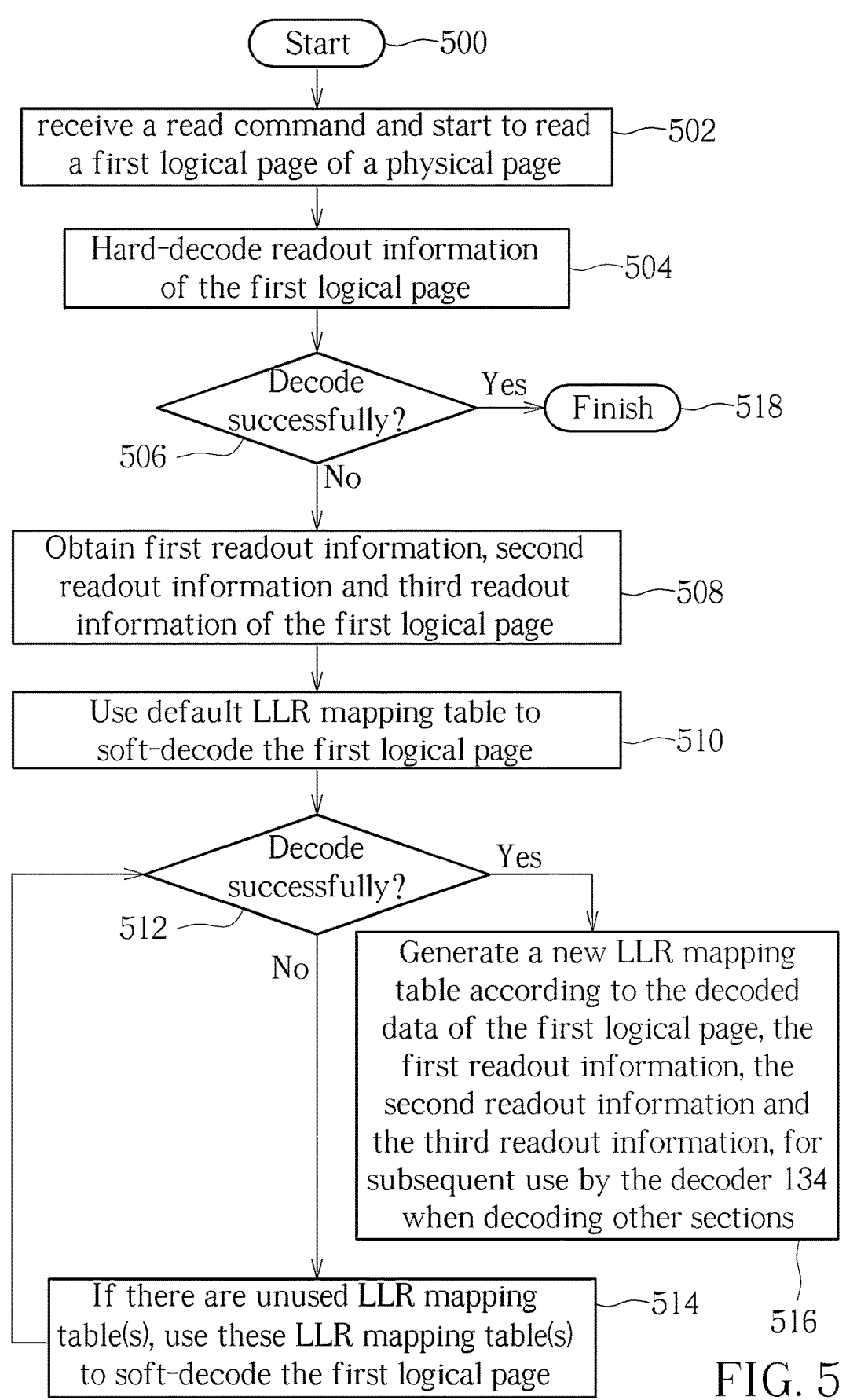
FIG. 5 is a flowchart of a method for accessing the flash memory module according to one embodiment of the present invention.

FIG. 5 is a flowchart of a method for accessing the flash memory module 120 according to one embodiment of the present invention. In Step 500, the flow starts. In Step 502, the microprocessor 112 in the flash memory controller 110 receives a read command, such as a read command from the host device 130, to start reading a first logical page of a physical page. Specifically, the microprocessor 112 sends a read request to the flash memory module 120 through the control logic 114 to request to read the first logical page. After receiving the read request, the flash memory module 120 uses a first set of threshold voltages to read a section of the first logical page to obtain readout information. In order to facilitate the following explanation, the physical page takes the physical page P_0 shown in FIG. 2 as an example, and each memory unit in the physical page P_0 can store four bits, that is, the physical page P_0 includes four logical pages, and the four logical pages are used to store the top bits, upper bits, middle bits and lower bits shown in FIG. 3, respectively. In addition, in the following description, the first logical page is used to store the upper bits.

Figure 6:
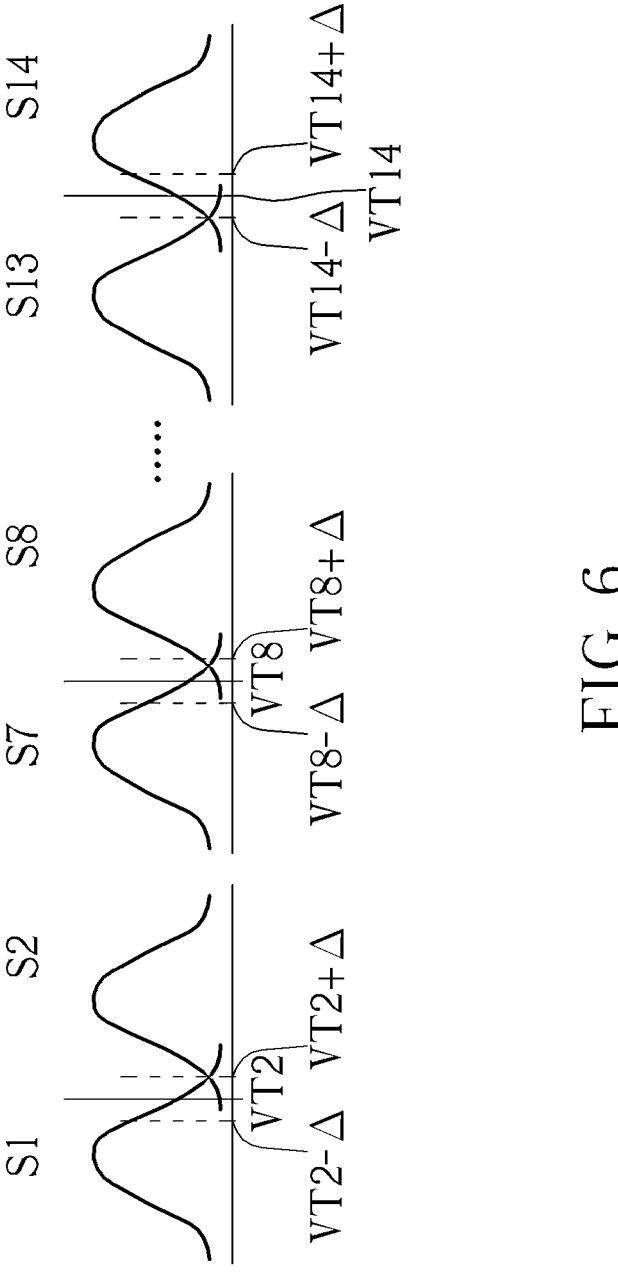
FIG. 6 is a diagram of using different threshold voltages to read the page according to one embodiment of the present invention.

In Step 504, the decoder 134 of the flash memory controller 110 performs a decoding operation on the readout information of a section of the first logical page. In this embodiment, since the first logical page is used to store the upper bits shown in FIG. 3, the first set of threshold voltages used to read the first logical page includes the threshold voltages VT2, VT8 and VT14 as shown in FIG. 3 or FIG. 6. In addition, the section in the first logical page can be a codec unit, and its size can be 4 kilo-bytes (KB) or other suitable sizes. The decoding process of this section by the decoder 134 may include a hard decoding and/or a soft decoding, where the hard decoding may be a Bose-Chaudhuri-Hocquenghem (BCH) code or a low-density parity code (LDPC) decoding method, and soft decoding can be the LDPC decoding method. Since the decoding operation of the decoder 134 is well known to those with ordinary knowledge in the art, the details of the decoding operation will not be described here.

In Step 506, the decoder 134 determines whether the readout information of the section of the first logical page is decoded successfully. If so, the flow enters Step 518 to end the read operation of the section of the first logical page; if not, the flow enters Step 508.

In Step 508, the flash memory controller 110 obtains first readout information, second readout information and third readout information of the section of the first logical page, wherein the first readout information, the second readout information and the third readout information are obtained by the flash memory module 120 using the first set of threshold voltages, a positively adjusted first set of threshold voltages and a negatively adjusted set of threshold voltages to read the section of the first logical page, respectively. In one embodiment, the first readout information may be the readout information obtained in Step 502, and the readout information temporarily stored in the control logic 114 may be directly used as the first readout information in Step 508. Taking FIG. 6 as an example, the control unit 136 of the flash memory controller 110 can send a read request to the flash memory module 120 to use the positively adjusted first set of threshold voltages (that is, the threshold voltage (VT2+ Δ), (VT8+Δ) and (VT14+Δ)) to read the first logical page to obtain the second readout information, where "Δ" can be any suitable adjustment value (voltage value). Then the control unit 136 of the flash memory controller 110 can send a read request to the flash memory module 120 to use the negatively adjusted first set of threshold voltages (that is, the threshold voltage (VT2-Δ), (VT8-Δ) and (VT14-Δ)) to read the first logical page to obtain the third readout information. In this embodiment, the first readout information, the second readout information and the third readout information are temporarily stored in a buffer within the control logic 114.

In this embodiment, assuming that the size of the section of the first logical page is 4 KB (that is, 32768 bits), then each of the first readout information, the second readout information and the third readout information will also have 32768 bits.

In Step 510, the decoder 134 uses a default LLR mapping table to soft-decode the section of the first logical page. Specifically, each bit in the first readout information can be regarded as a hard bit or a sign bit, and each bit in the second readout information and the third readout information is regarded as a soft bit. For each memory unit, it will have three bits of information, namely a hard bit, a first soft bit and a second soft bit, which are represented by (BH, BS1, BS2) in the following description. The above three bits of information (BH, BS1, BS2) have eight possible combinations, which are (1, 1, 1), (1, 1, 0), (1, 0, 1), (1, 0, 0), (0, 1, 1), (0, 1, 0), (0, 0, 1) and (0, 0, 0). The default LLR mapping table records different combinations (BH, BS1, BS2) and the corresponding LLR values, where the LLR value is used to represent the reliability of the hard bit. For example, if (BH, BS1, BS2) is equal to (1, 1, 1), it means that the upper bit of the memory unit has the highest reliability of "1" (for example, the bit value is "1" with 99% reliability); if (BH, BS1, BS2) is equal to (1, 1, 0), it means that the upper bit of the memory unit has the second highest reliability is "1"; if (BH, BS1, BS2) is equal to (0, 1, 1), it means that the upper bit of the memory unit has the highest reliability of "0", . . . , and so on. After determining the LLR value of each memory unit according to the default LLR mapping table, the LDPC decoding circuit in the decoder 134 can begin to soft-decode the section of the first logical page based on these LLR values. In addition, since the operations of the LLR mapping table and LDPC soft decoding are well known to those with ordinary knowledge in the art, these details will not be described here.

In Step 512, the decoder 134 determines whether the section can be decoded successfully. If the decoding operation fails, the flow enters Step 514; and if the decoding is successful, the flow enters Step 516.

In Step 514, if the control logic 114 includes other LLR mapping tables, the decoder 134 uses the other LLR mapping tables to soft-decode the section of the first logical page. In addition, if all the LLR mapping tables have been used and cannot successfully decode the section of the first logical page, the decoder 134 can use other suitable decoding methods, such as redundant array of independent disks (RAID) decoding method to decode.

In Step 516, the LLR mapping table generation/update unit 138 generates a new LLR mapping table according to the decoded data of the section of the first logical page, the first readout information, the second readout information and the third readout information, for subsequent use by the decoder 134 when decoding other sections. Specifically, the decoded data, the first readout information, the second readout information and the third readout information have the same number of bits, for example, 32768 bits. For each memory unit, it will have four bits of information, namely the decoded bit, the hard bit, the first soft bit and the second soft bit, which are represented by (DD, BH, BS1, BS2) in the following description. In addition, the above four bits of information (DD, BH, BS1, BS2) have sixteen possible combinations, which are (1, 1, 1, 1), (1, 1, 1, 0), (1, 1, 0, 1), (1, 1, 0, 0), (1, 0, 1, 1), (1, 0, 1, 0), (1, 0, 0, 1), (1, 0, 0, 0), (0, 1, 1, 1), (0, 1, 1, 0), (0, 1, 0, 1), (0, 1, 0, 0), (0, 0, 1, 1), (0, 0, 1, 0), (0, 0, 0, 1) and (0, 0, 0, 0). The sixteen combinations of four bits of information (DD, BH, BS1, BS2) respectively represent various combinations with different reliability and whether the decoded bit and hard bit are the same. For example, when (DD, BH, BS1, BS2) is equal to (1, 1, 1, 1), it means that the decoded bit and the hard bits are both "1" and have the highest reliability, that is, the upper bit of the memory unit has the highest reliability of "1" in the readout information before decoding, and the bit after decoding is really "1". When (DD, BH, BS1, BS2) is equal to (0, 1, 1, 1), it means that the upper bit of the memory unit has the highest reliability of "1" in the readout information before decoding, but the decoded bit is "0". When (DD, BH, BS1, BS2) is equal to (0, 0, 1, 1), it means that the decoded bit and the hard bits are both "0" and have the highest reliability, that is, the upper bit of the memory unit has the highest reliability of "0" in the readout information before decoding, and the bit after decoding is really "0". When (DD, BH, BS1, BS2) is equal to (1, 0, 1, 1), it means that the upper bit of the memory unit has the highest reliability of "0" in the readout information before decoding, but the decoded bit is "1". The LLR mapping table generation/update unit 138 counts the sixteen combinations of the above four bits of information (DD, BH, BS1, BS2) to calculate the number of each combination according to the decoded data, the first readout information, the second readout information and the third readout information of the section of the first logical page, and the LLR values corresponding to different combinations of (BH, BS1, BS2) in a new LLR mapping table are calculated. For example, assuming that the number of the combination (DD, BH, BS1, BS2) equal to (1, 1, 1, 1) is N1, and the number of the combination (DD, BH, BS1, BS2) equal to (1, 0, 1, 1) is N1, then in one embodiment, the LLR value corresponding to (BH, BS1, BS2) equal to (1, 1, 1) in the new LLR mapping table can be calculated as follows: In (N1/N2). In another example, assuming that the number of the combination (DD, BH, BS1, BS2) equal to (0, 0, 1, 1) is N3, and the number of the combination (DD, BH, BS1, BS2) equal to (1, 1, 1, 1) is N4, then in one embodiment, the LLR value corresponding to (BH, BS1, BS2) equal to (0, 1, 1) in the new LLR mapping table can be calculated as follows: In (N3/N4). Similarly, any of the other combinations of (BH, BS1, BS2) in the new LLR mapping table can also be obtained through the counter values of the two combinations of (DD, BH, BS1, BS2) (that is, divide the counter values of these two combinations and then take the logarithmic value). Since those with ordinary knowledge in the art should be able to understand the method of calculating other LLR values after reading the above embodiments, the detailed calculations of all LLR values are not listed here.

Then, the LLR mapping table generation/update unit 138 temporarily stores the new LLR mapping table into the storage unit in the control logic 114. In one embodiment, if the LLR mapping table generation/update unit 138 has generated a certain number of LLR mapping tables and the storage unit has insufficient space, the LLR mapping table generation/update unit 138 may use a new LLR mapping table to replace it. This newly generated LLR mapping table is used by the decoder 134 to decode other sections of the first logical page or to decode the section(s) of the other logical pages in Step 514.

As mentioned above, since the new LLR mapping table is generated according to the decoded data, the first readout information, the second readout information and the third readout information of the section of the first logical page, it can more accurately reflect the threshold voltage offset/shift of the memory units of the block 200 or the physical pageP_0. Therefore, by establishing a new LLR mapping table, the decoder 134 can have a higher success rate when decoding subsequent sections.

In the above embodiment, the new LLR mapping table is for the threshold voltages VT2, VT8 and VT14 used to read the first logical page of the physical page P_0. However, since the threshold voltage distributions of the states S0-S15 are different, the shift directions and shift amount of threshold voltages VT1-VT15 will also be different. Therefore, the above-mentioned new LLR mapping table will still have limitations in improving the decoding capability of the decoder 134. In another embodiment of the present invention, the LLR mapping table generation/update unit 138 generates a new LLR mapping table for each of the threshold voltages VT2, VT8 and VT14, to further improve the decoding capability of the decoder 134.

Specifically, in Step 516, after obtaining the decoded data, the first readout information, the second readout information and the third readout information of the section of the first logical page of physical page P_0, the control unit 136 then transmits one or more read requests to obtain the decoded data of the section of the second logical page of the physical page P_0 and the decoded data of the section of the third logical page of the physical page P_0. In this embodiment, the purpose of obtaining the decoded data of the section of the second logical page and the decoded data of the section of the third logical page is to identify which one of the threshold voltage V2, V8 and V4 the decoded data, the first readout information, the second readout information and the third readout information correspond to. Therefore, the selection of the second logical page and the third logical page needs to meet the following conditions: (1) The two adjacent states of each threshold voltage VT2, VT8 and VT14 in the first set of threshold voltages correspond to the same bit value in the second logical page, and also correspond to the same bit value in the third logical page; the two adjacent states of each threshold voltage VT2, VT8 and VT14 in the first set of threshold voltages correspond to the bit value (b1) in the second logical page and the bit value (b2) corresponding to the third logical page have different combinations of (b1, b2); and the combinations (b1, b2) of the threshold voltage VT2, VT8 and VT14 correspond to three of (1, 1), (1, 0), (0, 1) and (0, 0). Taking FIG. 3 as an example, the second logical page and the third logical page can be used to store the top bits and the lower bits, respectively, wherein the bit value corresponding to the two states S1 and S2 adjacent to threshold voltage VT2 in the second logical page and the bit value corresponding to the two states S1 and S2 adjacent to threshold voltage VT2 in the third logical page have the first combination (1, 0), the bit value corresponding to the two states S7 and S8 adjacent to threshold voltage VT8 in the second logical page and the bit value corresponding to the two states S7 and S8 adjacent to threshold voltage VT8 in the third logical page have the second combination (0, 0), and the bit value corresponding to the two states S13 and S14 adjacent to threshold voltage VT14 in the second logical page and the bit value corresponding to the two states S13 and S14 adjacent to threshold voltage VT14 in the third logical page have the third combination (0, 1).

For the case where the bit value corresponding to the second logical page and the bit value corresponding to the third logical page have the first combination (1, 0), the LLR mapping table generation/update unit 138 generates a first LLR mapping table based on the decoded data, the first readout information, the second readout information and the third readout information of the section of the first logical page, for the decoder 134 to decode the other sections, wherein the first LLR mapping table is used by the decoder 134 when subsequently using the threshold voltages VT2, (VT2–Δ) and (VT2+Δ) to read the memory units. For the case where the bit value corresponding to the second logical page and the bit value corresponding to the third logical page have the second combination (0, 0), the LLR mapping table generation/update unit 138 generates a second LLR mapping table based on the decoded data, the first readout information, the second readout information and the third readout information of the section of the first logical page, for the decoder 134 to decode the other sections, wherein the second LLR mapping table is used by the decoder 134 when subsequently using the threshold voltages VT8, (VT8–Δ) and (VT8+Δ) to read the memory units. For the case where the bit value corresponding to the second logical page and the bit value corresponding to the third logical page have the third combination (0, 1), the LLR mapping table generation/update unit 138 generates a third LLR mapping table based on the decoded data, the first readout information, the second readout information and the third readout information of the section of the first logical page, for the decoder 134 to decode the other sections, wherein the third LLR mapping table is used by the decoder 134 when subsequently using the threshold voltages VT14, (VT14–Δ) and (VT14+Δ) to read the memory units.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for accessing a flash memory module, comprising:

using a first set of threshold voltages, a positively adjusted first set of threshold voltages and a negatively adjusted first set of threshold voltages to read a first logical page of a physical page of the flash memory module to obtain first readout information, second readout information and third readout information, respectively;

decoding the first readout information, the second readout information and the third readout information to generate decoded data of the first logical page; and generating a log-likelihood ratio (LLR) mapping table according to the decode data of the first logical page, the first readout information, the second readout information and the third readout information, for use when reading and decoding other logical pages;

wherein the physical page comprises a plurality of memory units, each memory unit is used to store a plurality of bits, each memory unit supports a plurality of states, and the plurality of states are used to represent different combinations of the plurality of bits; and the first readout information comprises a hard bit of each memory unit, the second readout information comprises a first soft bit of each memory unit, and the third readout information comprises a second soft bit of each memory unit; and the step of generating the LLR mapping table according to the decode data of the first logical page, the first readout information, the second readout information and the third readout information comprises:

counting sixteen combinations of the decoded data, the hard bit, the first soft bit and the second soft bit according to the decode data of the first logical page, the first readout information, the second readout information and the third readout information, to calculate a number of each of the sixteen combinations of the decoded data, the hard bit, the first soft bit and the second soft bit, for generating the LLR mapping table.

2. The method of claim 1, wherein the first set of threshold voltages comprises a first threshold voltage, a second threshold voltage, a third threshold voltage and a fourth threshold voltage; the positively adjusted first set of threshold voltages comprises the first threshold voltage plus an adjustment value, the second threshold voltage plus the adjustment value, the third threshold voltage plus the adjustment value, and the fourth threshold voltage plus the adjustment value; and the negatively adjusted first set of threshold voltages comprises the first threshold voltage minus the adjustment value, the second threshold voltage minus the adjustment value, the third threshold voltage minus the adjustment value, and the fourth threshold voltage minus the adjustment value.

3. The method of claim 1, wherein the decoded data is first decoded data, and the method further comprises:

using a second set of threshold voltages to read a second logical page of the physical page of the flash memory module, and decoding readout information of the second logical page to generate second decoded data;

using a third set of threshold voltages to read a third logical page of the physical page of the flash memory module, and decoding readout information of the third logical page to generate third decoded data; and the step of generating the LLR mapping table according to the decode data of the first logical page, the first readout information, the second readout information and the third readout information comprises:

generating at least a first LLR mapping table, a second LLR mapping table and a third LLR mapping table according to the decode data of the first logical page, the first readout information, the second readout information, the third readout information, the second decoded data of the second logical page and the third decoded data of the third logical page.

4. A method for accessing a flash memory module, comprising:

using a first set of threshold voltages, a positively adjusted first set of threshold voltages and a negatively adjusted first set of threshold voltages to read a first logical page of a physical page of the flash memory module to obtain first readout information, second readout information and third readout information, respectively;

decoding the first readout information, the second readout information and the third readout information to generate decoded data of the first logical page; and generating a log-likelihood ratio (LLR) mapping table according to the decode data of the first logical page, the first readout information, the second readout information and the third readout information, for use when reading and decoding other logical pages;

wherein the decoded data is first decoded data, and the method further comprises:

using a second set of threshold voltages to read a second logical page of the physical page of the flash memory module, and decoding readout information of the second logical page to generate second decoded data;

using a third set of threshold voltages to read a third logical page of the physical page of the flash memory module, and decoding readout information of the third logical page to generate third decoded data; and the step of generating the LLR mapping table according to the decode data of the first logical page, the first readout information, the second readout information and the third readout information comprises:

generating at least a first LLR mapping table, a second LLR mapping table and a third LLR mapping table according to the decode data of the first logical page, the first readout information, the second readout information, the third readout information, the second decoded data of the second logical page and the third decoded data of the third logical page;

wherein the physical page comprises a plurality of memory units, each memory unit is used to store a plurality of bits, each memory unit supports a plurality of states, and the plurality of states are used to represent different combinations of the plurality of bits; two adjacent states of each threshold voltage of the first set of threshold values correspond to a same first bit value in the second logical page, and the two adjacent states of each threshold voltage of the first set of threshold values correspond to a same second bit value in the third logical page; and the two adjacent states of each threshold voltage of the first set of threshold correspond to the first bit value in the second logical page and the second bit value in the third logical page have different combinations; and the step of generating at least the first LLR mapping table, the second LLR mapping table and the third LLR mapping table according to the decode data of the first logical page, the first readout information, the second readout information, the third readout information, the second decoded data of the second logical page and the third decoded data of the third logical page comprises:

for a case where the first bit value corresponding to the second logical page and the second bit value corresponding to the third logical page have a first combination, generating the first LLR mapping table according to the decode data of the first logical page, the first readout information, the second readout information and the third readout information;

for a case where the first bit value corresponding to the second logical page and the second bit value corresponding to the third logical page have a second combination, generating the second LLR mapping table according to the decode data of the first logical page, the first readout information, the second readout information and the third readout information; and for a case where the first bit value corresponding to the second logical page and the second bit value corresponding to the third logical page have a third combination, generating the third LLR mapping table according to the decode data of the first logical page, the first readout information, the second readout information and the third readout information.

5. A flash memory controller, wherein the flash memory controller is configured to access a flash memory module, and the flash memory controller comprises:

a read-only memory, configured to store a program code;
a buffer memory; and
a microprocessor, configured to execute the program code to control access of the flash memory module;
wherein the microprocessor is configured to perform the steps of:
using a first set of threshold voltages, a positively adjusted first set of threshold voltages and a negatively adjusted first set of threshold voltages to read a first logical page of a physical page of the flash memory module to obtain first readout information, second readout information and third readout information, respectively;

decoding the first readout information, the second readout information and the third readout information to generate decoded data of the first logical page; and generating a log-likelihood ratio (LLR) mapping table according to the decode data of the first logical page, the first readout information, the second readout information and the third readout information, for use when reading and decoding other logical pages;

wherein the physical page comprises a plurality of memory units, each memory unit is used to store a plurality of bits, each memory unit supports a plurality of states, and the plurality of states are used to represent different combinations of the plurality of bits; and the first readout information comprises a hard bit of each memory unit, the second readout information comprises a first soft bit of each memory unit, and the third readout information comprises a second soft bit of each memory unit; and the step of generating the LLR mapping table according to the decode data of the first logical page, the first readout information, the second readout information and the third readout information comprises:

counting sixteen combinations of the decoded data, the hard bit, the first soft bit and the second soft bit according to the decode data of the first logical page, the first readout information, the second readout information and the third readout information, to calculate a number of each of the sixteen combinations of the decoded data, the hard bit, the first soft bit and the second soft bit, for generating the LLR mapping table.

6. The flash memory controller of claim 5, wherein the first set of threshold voltages comprises a first threshold voltage, a second threshold voltage, a third threshold voltage and a fourth threshold voltage; the positively adjusted first set of threshold voltages comprises the first threshold voltage plus an adjustment value, the second threshold voltage plus the adjustment value, the third threshold voltage plus the adjustment value, and the fourth threshold voltage plus the adjustment value; and the negatively adjusted first set of threshold voltages comprises the first threshold voltage minus the adjustment value, the second threshold voltage minus the adjustment value, the third threshold voltage minus the adjustment value, and the fourth threshold voltage minus the adjustment value.

7. The flash memory controller of claim 5, wherein the decoded data is first decoded data, and the method further comprises:

using a second set of threshold voltages to read a second logical page of the physical page of the flash memory module, and decoding readout information of the second logical page to generate second decoded data;

using a third set of threshold voltages to read a third logical page of the physical page of the flash memory module, and decoding readout information of the third logical page to generate third decoded data; and the step of generating the LLR mapping table according to the decode data of the first logical page, the first readout information, the second readout information and the third readout information comprises:

generating at least a first LLR mapping table, a second LLR mapping table and a third LLR mapping table according to the decode data of the first logical page, the first readout information, the second readout information, the third readout information, the second decoded data of the second logical page and the third decoded data of the third logical page.

8. The flash memory controller of claim 7, wherein two adjacent states of each threshold voltage of the first set of threshold values correspond to a same first bit value in the second logical page, and the two adjacent states of each threshold voltage of the first set of threshold values correspond to a same second bit value in the third logical page; and the two adjacent states of each threshold voltage of the first set of threshold correspond to the first bit value in the second logical page and the second bit value in the third logical page have different combinations; and the step of generating at least the first LLR mapping table, the second LLR mapping table and the third LLR mapping table according to the decode data of the first logical page, the first readout information, the second readout information, the third readout information, the second decoded data of the second logical page and the third decoded data of the third logical page comprises:

for a case where the first bit value corresponding to the second logical page and the second bit value corresponding to the third logical page have a first combination, generating the first LLR mapping table according to the decode data of the first logical page, the first readout information, the second readout information and the third readout information;

for a case where the first bit value corresponding to the second logical page and the second bit value corresponding to the third logical page have a second combination, generating the second LLR mapping table according to the decode data of the first logical page, the first readout information, the second readout information and the third readout information; and for a case where the first bit value corresponding to the second logical page and the second bit value corresponding to the third logical page have a third combination, generating the third LLR mapping table according to the decode data of the first logical page, the first readout information, the second readout information and the third readout information.

9. A memory device, comprising:

a flash memory module; and a flash memory controller, configured to access the flash memory module;

wherein the flash memory controller is configured to perform the steps of:

using a first set of threshold voltages, a positively adjusted first set of threshold voltages and a negatively adjusted first set of threshold voltages to read a first logical page of a physical page of the flash memory module to obtain first readout information, second readout information and third readout information, respectively;

decoding the first readout information, the second readout information and the third readout information to generate decoded data of the first logical page; and generating a log-likelihood ratio (LLR) mapping table according to the decode data of the first logical page, the first readout information, the second readout information and the third readout information, for use when reading and decoding other logical pages;

wherein the physical page comprises a plurality of memory units, each memory unit is used to store a plurality of bits, each memory unit supports a plurality of states, and the plurality of states are used to represent different combinations of the plurality of bits; and the first readout information comprises a hard bit of each memory unit, the second readout information comprises a first soft bit of each memory unit, and the third readout information comprises a second soft bit of each memory unit; and the step of generating the LLR mapping table according to the decode data of the first logical page, the first readout information, the second readout information and the third readout information comprises:

counting sixteen combinations of the decoded data, the hard bit, the first soft bit and the second soft bit according to the decode data of the first logical page, the first readout information, the second readout information and the third readout information, to calculate a number of each of the sixteen combinations of the decoded data, the hard bit, the first soft bit and the second soft bit, for generating the LLR mapping table.

10. The memory device of claim 9, wherein the first set of threshold voltages comprises a first threshold voltage, a second threshold voltage, a third threshold voltage and a fourth threshold voltage; the positively adjusted first set of threshold voltages comprises the first threshold voltage plus an adjustment value, the second threshold voltage plus the adjustment value, the third threshold voltage plus the adjustment value, and the fourth threshold voltage plus the adjustment value; and the negatively adjusted first set of threshold voltages comprises the first threshold voltage minus the adjustment value, the second threshold voltage minus the adjustment value, the third threshold voltage minus the adjustment value, and the fourth threshold voltage minus the adjustment value.

11. The memory device of claim 9, wherein the decoded data is first decoded data, and the method further comprises:

using a second set of threshold voltages to read a second logical page of the physical page of the flash memory module, and decoding readout information of the second logical page to generate second decoded data;

using a third set of threshold voltages to read a third logical page of the physical page of the flash memory module, and decoding readout information of the third logical page to generate third decoded data; and the step of generating the LLR mapping table according to the decode data of the first logical page, the first readout information, the second readout information and the third readout information comprises:

generating at least a first LLR mapping table, a second LLR mapping table and a third LLR mapping table according to the decode data of the first logical page, the first readout information, the second readout information, the third readout information, the second decoded data of the second logical page and the third decoded data of the third logical page.

12. The memory device of claim 11, wherein two adjacent states of each threshold voltage of the first set of threshold values correspond to a same first bit value in the second logical page, and the two adjacent states of each threshold voltage of the first set of threshold values correspond to a same second bit value in the third logical page; and the two adjacent states of each threshold voltage of the first set of threshold correspond to the first bit value in the second logical page and the second bit value in the third logical page have different combinations; and the step of generating at least the first LLR mapping table, the second LLR mapping table and the third LLR mapping table according to the decode data of the first logical page, the first readout information, the second readout information, the third readout information, the second decoded data of the second logical page and the third decoded data of the third logical page comprises:

for a case where the first bit value corresponding to the second logical page and the second bit value corresponding to the third logical page have a first combination, generating the first LLR mapping table according to the decode data of the first logical page, the first readout information, the second readout information and the third readout information;

for a case where the first bit value corresponding to the second logical page and the second bit value corresponding to the third logical page have a second combination, generating the second LLR mapping table according to the decode data of the first logical page, the first readout information, the second readout information and the third readout information; and for a case where the first bit value corresponding to the second logical page and the second bit value corresponding to the third logical page have a third combination, generating the third LLR mapping table according to the decode data of the first logical page, the first readout information, the second readout information and the third readout information.

* * * * *